US012662569B2

(12) United States Patent
Harrisson et al.

(10) Patent No.: US 12,662,569 B2
(45) Date of Patent: Jun. 23, 2026

(54) PROCESS FOR THE FREE RADICAL POLYMERIZATION OF THIONOLACTONES OR THIONOCARBONATES

(71) Applicants: CENTRE NATIONAL DE LA RECHERCHE SCIENTIFIQUE, Paris (FR); UNIVERSITE TOULOUSE III—PAUL SABATIER, Toulouse (FR)

(72) Inventors: Simon Harrisson, Cadaujac (FR); Mathias Destarac, Balma (FR)

(73) Assignees: CENTRE NATIONAL DE LA RECHERCHE SCIENTIFIQUE, Paris (FR); UNIVERSITE TOULOUSE III—PAUL SABATIER, Tolouse (FR)

( * ) Notice: Subject to any disclaimer, the term of this patent is extended or adjusted under 35 U.S.C. 154(b) by 854 days.

(21) Appl. No.: 17/917,366

(22) PCT Filed: Apr. 8, 2021

(86) PCT No.: PCT/FR2021/050622
§ 371 (c)(1),
(2) Date: Oct. 6, 2022

(87) PCT Pub. No.: WO2021/205123
PCT Pub. Date: Oct. 14, 2021

(65) Prior Publication Data

US 2023/0151147 A1 May 18, 2023

(30) Foreign Application Priority Data

Apr. 9, 2020 (FR) ...................................... 2003601

(51) Int. Cl.

| | |
|---|---|
| ***C08G 63/688*** | (2006.01) |
| ***C08F 2/02*** | (2006.01) |
| ***C08F 2/04*** | (2006.01) |
| ***C08F 218/08*** | (2006.01) |
| ***C08G 63/08*** | (2006.01) |

(52) U.S. Cl.
CPC .............. *C08G 63/688* (2013.01); *C08F 2/02* (2013.01); *C08F 2/04* (2013.01); *C08F 218/08* (2013.01); *C08G 63/08* (2013.01); *C08G 2230/00* (2013.01)

(58) Field of Classification Search
CPC . C08F 8/34; C08F 2/04; C07D 333/50; C07D 333/32; C08G 63/688; C08G 63/08; C08G 63/06
See application file for complete search history.

(56) References Cited

PUBLICATIONS

French Search Report, dated Nov. 6, 2020, from corresponding application No. FR 2003601, 2 pgs.
International Search Report and Written Opinion, dated May 31, 2021, from corresponding application No. PCT/FR2021/050622, 18 pgs.
Bingham et al. "Degradable vinyl copolymers through thiocarbonyl addition-ring-opening (TARO) polymerization" Chemical Communications, Royal Society of Chemistry GBR, vol. 55, No. 1, Jan. 4, 2019 (Jan. 4, 2019), pp. 55-58, 5 pgs.
Hedir et al. "Functional degradable polymers by radical ring-opening copolymerization of MDO and vinyl promobutanoate: Synthesis, degradability and post-polymerization modification" Biomacromolecules, American Chemical Society USA, vol. 16, No. 7, Jul. 13, 2015 (Jul. 13, 2015), pp. 2049-2058, 12 pgs.

*Primary Examiner* — Gregory Listvoyb
(74) *Attorney, Agent, or Firm* — Maier & Maier, PLLC

(57) ABSTRACT

A process for preparing preferably degradable copolymers by free radical ring-opening polymerization using thionolactone monomers or thionocarbonate monomers, in the presence of a radical polymerization initiator. Also, the copolymers, which include thioester or thiocarbonate bonds, that are obtained by carrying out the process including the free radical ring-opening polymerization using thionolactone monomers or thionocarbonate monomers.

14 Claims, No Drawings

PROCESS FOR THE FREE RADICAL POLYMERIZATION OF THIONOLACTONES OR THIONOCARBONATES

FIELD

The present invention relates to a simple process for preparing polymers, preferably biodegradable polymers, from thionolactanones or thionocarbonates.

More particularly, the present invention relates to a process for preparing copolymers, preferably degradable copolymers, by radical ring-opening polymerization notably using monomers of thionolactone or thionocarbonate type, and also to the copolymers, preferably degradable copolymers, obtained by the implementation of this process.

BACKGROUND

Most synthetic polymers are currently synthesized by radical polymerization of vinyl monomers such as for example ethylene, methyl methacrylate, styrene and vinyl acetate.

Synthesis processes via radical pathway have the advantage of tolerating a large range of functionalities, thus enabling the synthesis of numerous materials. The application of controlled radical polymerization techniques, developed towards the end of the 20$^{th}$ century, also enable the synthesis of polymers and copolymers of complex architecture, comprising block copolymers, gradient copolymers or star-branch copolymers, with control of the average molar mass of the polymer and also of the molar mass distribution.

One of the main disadvantages of polymers derived from radical polymerization is that they are difficult to degrade. Specifically, the various monomer units are bonded together by carbon-carbon (C—C) bonds that are resistant to degradation. This can lead to environmental damage and thus limits the application of these polymers in the medical field where it is important to avoid the accumulation of high-molar-mass polymers in the body.

One means of introducing the property of degradability into synthetic polymers obtained by radical polymerization is to use a cyclic comonomer that polymerizes by radical ring-opening polymerization (RROP). These monomers are mainly of two types: vinylic and exo-methylenic. The polymerization of these monomers proceeds by the addition of a radical with the double bond, followed by the opening of the ring and the generation of a linear species according to the following reaction schemes (1) and (2), relating respectively to vinyl monomers (1) and exo-methylene monomers (2):

Reaction scheme (1)

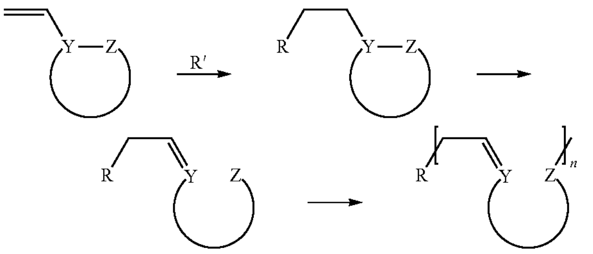

Reaction scheme (2)

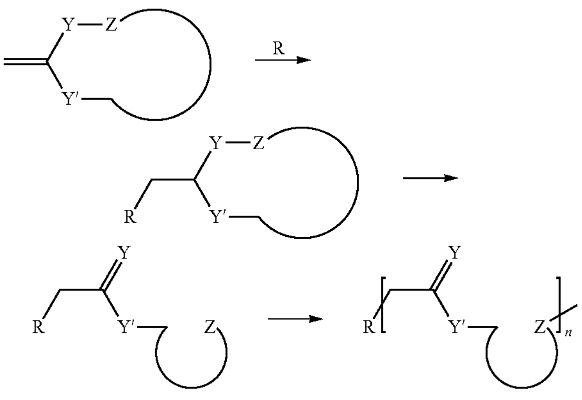

According to the processes represented in reaction schemes (1) and (2), and if the ring of vinyl or exo-methylene type bears a degradable functionality, this functionality can then be incorporated into the polymer backbone, making it degradable itself. Among the monomers of exo-methylene type, mention may in particular be made of 2-methylene-1,3-dioxane (MDO) which is converted into an ester during the radical polymerization (with Y=Y' ═O in reaction scheme 2). Recently, this monomer and other cyclic monomers were studied in controlled radical polymerization as described for example in the article by G. G. Hedir and al. (*Biomacromolecules,* 2015, 16, 2049-2058). They copolymerize easily with vinyl esters and vinyl ethers but have greater difficulty copolymerizing with styrene, (meth)acrylate and (meth)acrylamide monomers. These monomers are however difficult to synthesize.

More recently, certain authors have proposed the use of various monomers of thionolactone type, such as γ-phenyl-γ-butyrolactone or thionophthalides in radical polymerization reactions, in combination with various monomers (N. M. Bingham and al. (*Chem. Commun.,* 2019, 55, 55). It turns out that these monomers inhibit the radical polymerization of vinyl acetate and are not incorporated into the polymer backbone when they are combined with styrene, methyl acrylate or methyl methacrylate. Only one monomer tested, namely dibenzo[c,e]oxepane-5-thione (or DOT) polymerizes via radical pathway in the presence of a comonomer such as methyl acrylate, poly(ethylene glycol)methyl ether acrylate (PEGA), N,N-dimethyl acrylamide, and acrylonitrile. However, this same DOT monomer inhibits the radical polymerization of vinyl acetate, and of N-vinylcarbazole, and retards the radical polymerization of styrene without being incorporated in the polymer backbone. The predictability of the DOT monomer with regard to its ability to be used in radical polymerization with a comonomer bearing an ethylenic unsaturation is therefore completely random. Furthermore, this DOT monomer is quite difficult to synthesize.

SUMMARY

There is therefore a need for a synthesis process that makes it possible to obtain, in a simple manner and preferably with good yields, novel synthetic polymers, preferably which are degradable, via a radical pathway. More particularly, the objective of the present invention is to provide a process that is easy to implement and offers the possibility of obtaining a variety of original polymers from accessible compounds.

According to the present invention, a degradable polymer is understood to mean a polymer with a backbone that comprises bonds that may be easily broken, notably by chemical hydrolysis or enzymatic digestion, in order to lead to molecules of smaller size that are potentially less polluting. According to the invention, said bonds are in particular thioester bonds or thiocarbonate bonds.

Surprisingly, the inventors have developed a radical ring-opening polymerization process that makes it possible to achieve these objectives, by carefully selecting the comonomers that are incorporated into the polymerization reaction.

DETAILED DESCRIPTION

A first subject of the present invention is therefore a process for preparing copolymers, preferably degradable copolymers, said process comprising at least one step of radical ring-opening polymerization of at least one cyclic monomer with at least one monomer comprising an ethylenic unsaturation, in the presence of a radical polymerization initiator, said process being characterized in that:

said process comprising at least one step of radical ring-opening polymerization of at least one cyclic monomer with at least one monomer comprising an ethylenic unsaturation, in the presence of a radical polymerization initiator, said process being characterized in that:

(i) the cyclic monomer is chosen from thionolactones and thionocarbonates of formula (I) below:

(I)

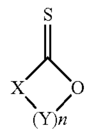

wherein:

X is an oxygen atom or a —$CH_2$— group;

Y is chosen from —$CH_2$—, —$CH_2$—O—$CH_2$—, —O—$CH_2$—$CH_2$, —$CH_2$—$CH_2$—O—$CH_2$—$CH_2$ and $CH_2$—O—$CH_2$—$CH_2$ groups;

n is an integer greater than or equal to 1, and preferably less than or equal to 25;

it being understood that:

when Y represents a —$CH_2$— group, then n is greater than or equal to 4, when X represents an oxygen atom, then Y is other than an —O—$CH_2$—$CH_2$— group; and when X represents a —$CH_2$— group, and when Y represents an —O—$CH_2$—$CH_2$— group, then the oxygen atom of the Y group is connected to X;

and in that (ii) the monomer comprising an ethylenic unsaturation is chosen from the monomers of formula (II) below:

(II)

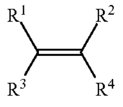

wherein:

$R^1$, $R^2$ and $R^3$ are identical and represent a hydrogen atom, $R^4$ represents a hydrogen atom, an alkyl radical, or a group chosen from imidazole, alkylimidazolium, carbazole, —OC(O)$R^5$ groups, or a group of formula (III) below:

(III)

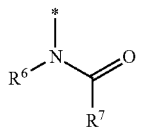

$R^5$ represents an alkyl, haloalkyl, trifluoroalkyl, aryl or arylalkyl radical, the asterisk (*) represents the anchoring point of the group of formula (III) to the carbon atom of the compound of formula (II), $R^6$ and $R^7$, which are identical or different, represent a hydrogen atom, an alkyl, cycloalkyl, arylalkyl, aryl, glycidyl radical, or else $R^6$ and $R^7$, together with the nitrogen and carbon atoms of the group of formula (III) to which they are bonded, form a heterocycle comprising from 4 to 7 carbon atoms (by including the carbon atom bearing the oxygen atom).

Thanks to this process, it is now possible to obtain, in a simple manner and preferably with good yields, copolymers, preferably that are degradable and whose degradability can be easily adjusted by modifying the respective proportions of the monomers of formula (I) and (II). Specifically, since the degradability of the copolymer is provided by the presence of thioester or thiocarbonate bonds following the incorporation of the monomers of formula (I) into the backbone of the copolymer, the greater their proportion relative to the monomers of formula (II), the greater the degradability of the copolymer. Thus, after degradation, the length of the fragments obtained is inversely proportional to the amount of monomers of formula (I) integrated into the polymer backbone. Furthermore, the chemical groups of the ends of the fragments obtained are functional and reactive. The monomers of formula (I) taking part in the radical copolymerization reaction according to the process in accordance with the invention, are easier to synthesize according to the conventional techniques known to those skilled in the art from commercially available non-sulfur-containing precursors (lactones). Lastly, the monomers of formula (II) are for the most part commercially available.

According to one preferred embodiment of the process in accordance with the invention, the monomers of formula (I) are thionolactones (i.e. X is a —$CH_2$— group).

In the thionolactones or thionocarbonates (i.e. X represents an oxygen atom) of formula (I), and when Y is a —$CH_2$— group, then n preferably varies from 4 to 25, and particularly preferably from 4 to 21 carbon atoms.

In the thionolactones or thionocarbonates of formula (I), and when Y is a —$CH_2$—O—$CH_2$—, —O—$CH_2$—$CH_2$, —$CH_2$—$CH_2$—O—$CH_2$—$CH_2$ or $CH_2$—O—$CH_2$—$CH_2$ group then n preferably varies from 1 to 5, and particularly preferably from 1 to 3 carbon atoms.

In the thionolactones or thionocarbonates of formula (I), and when Y is more specifically a —$CH_2$—O—$CH_2$— or —O—$CH_2$—$CH_2$ group, then preferentially n=1, 2 or 3, and even more preferentially n=2 or 3.

The value of n as defined in the invention makes it possible to have access to monomers (I) having a ring tension sufficient to enable the opening thereof and the polymerization, in particular when n≤10.

According to one preferred embodiment of the process in accordance with the invention, the thionolactones or thionocarbonates of formula (I) are chosen from ε-thionocaprolactone of formula (I-1) below, ω-pentadecathionolactone of formula (I-2) below, nonadecathionolactone of formula (I-3), tricosathionolactone of formula (I-4), crown ethers comprising a thionoester, such as the compound of formula (I-5) below, tetramethylene thionocarbonate (TMTC) of formula (I-6) below, and diethylene glycol thionocarbonate of formula (I-7) below:

(I-1)

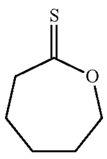

(I-2)

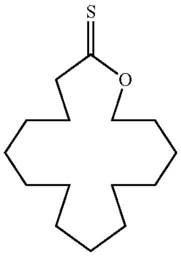

(I-3)

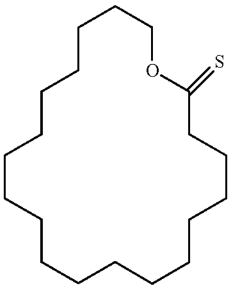

(I-4)

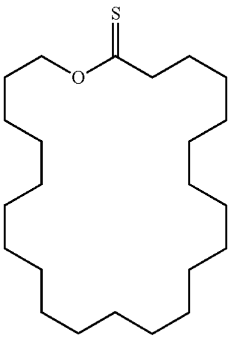

(I-5)

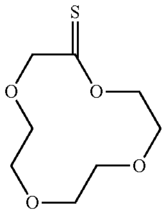

-continued (I-6)

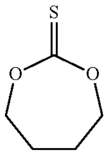

(I-7)

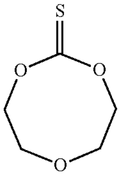

Among these thionolactones or these thionocarbonates of formula (I-1) to (I-7), ε-thionocaprolactone of formula (I-1) is particularly preferred.

The alkyl radicals mentioned for $R^4$, $R^5$, $R^6$ and $R^7$ may be linear or branched and comprise from 1 to 22 carbon atoms, said radicals being optionally substituted with at least one hydroxyl, aryl or cycloalkyl radical. In this respect, mention may for example be made of the methyl, ethyl, iso-propyl, n-butyl, 2-butyl, iso-butyl, tert-butyl, n-pentyl, iso-pentyl, neo-pentyl, tert-pentyl, 2-methylbutyl, hexyl, n-octyl, iso-octyl, 2-ethyl-1-hexyl, 2,2,4-trimethylpentyl, nonyl, neo-decanyl, decyl, dodecyl, octadecyl, behenyl, 3-phenylpropyl, 3,3-diphenylpropyl, 2,3-dihydroxypropyl and cyclohexylmethyl radicals.

The cycloalkyl radicals mentioned for $R^6$ and $R^7$ preferably comprise from 3 to 12 carbon atoms. Among such cycloalkyl radicals, mention may notably be made of adamantyl and cyclohexyl radicals.

For the purposes of the present invention, an aryl radical is understood to mean a monocyclic or polycyclic aromatic hydrocarbon group optionally substituted by an alkyl or alkoxyl radical. As aryl radical, mention may in particular be made of phenyl, trityl and p-methoxybenzyl, naphthalenyl, anthracenyl, and pyrenyl groups. Among such groups, the phenyl group is particularly preferred.

When $R^4$ represents an alkylimidazolium radical, the alkyl substituant may comprise from 1 to 16 carbon atoms. In this case, the alkylimidazolium radical comprises a counterion that may for example be chosen from the ions $Br^-$, $BF_4^-$, $PF_6^-$, etc.

Among the arylalkyl radicals mentioned for $R^6$ and $R^7$, mention may very particularly be made of the benzyl radical.

When $R^6$ and $R^7$, together with the nitrogen and carbon atoms of the group of formula (III) to which they are bonded, form a heterocycle, this may notably be a pyrrolidone or caprolactam ring.

According to one preferred embodiment of the invention, $R^4$ represents a methyl or hexyl radical, $R^5$ represents a methyl or t-butyl radical, $R^6$ and $R^7$ are identical and represent a methyl radical or else form, together with the nitrogen and carbon atoms of the group of formula (III) to which they are bonded, a pyrrolidone or caprolactam ring.

According to a first preferred embodiment of the process in accordance with the present invention, the monomers of formula (II) are chosen from those in which $R^4$ represents an —OC(O)$R^5$ group. These particular monomers of formula (II) are vinyl esters, they may be represented by the formula (II-1) below:

(II-1)

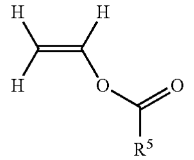

wherein $R^5$ may take on the same meanings as those indicated above for the monomers of formula (II).

Among the monomers of formula (II-1), mention may be made of vinyl acetate, vinyl pivalate, vinyl trifluoroacetate, vinyl chloroacetate, vinyl propionate, vinyl butyrate, vinyl neodecanoate ($R^5$=$C_9H_{19}$, mixture of isomers) and vinyl trifluorobutyrate. Among these monomers of formula (II-1), vinyl acetate and vinyl pivalate are particularly preferred.

According to a second preferred embodiment of the process in accordance with the present invention, the monomers of formula (II) a chosen from those wherein $R^4$ represents a linear or branched alkyl radical. These particular monomers of formula (II) are α-olefins. Among such monomers of formula (II), mention may be made of ethylene and octene. Ethylene is particularly preferred.

According to a third preferred embodiment of the process in accordance with the present invention, the monomers of formula (II) are chosen from those in which $R^4$ represents a group of formula (III). These particular monomers of formula (II) are N-vinyl monomers, they may be represented by the formula (II-2) below:

(II-2)

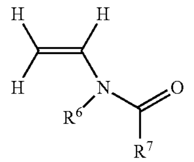

wherein $R^6$ and $R^7$ may take on the same meanings as those indicated above for the group of formula (III) of the monomers of formula (II).

Among the monomers of formula (II-2), mention may in particular be made of acyclic N-vinyl monomers such as N-vinylformamide, N-vinylacetamide and N-methyl-N-vinylacetamide, and also cyclic N-vinyl monomers, (when $R^6$ and $R^7$ form a heterocycle together with the nitrogen and carbon atoms of the group of formula (III) to which they are bonded) such as N-vinylpyrrolidone, N-vinylpiperidone, and N-vinylcaprolactam. Among such monomers of formula (II-2), N-vinylacetamide and N-vinylpyrrolidone are particularly preferred.

According to one particularly preferred embodiment of the process in accordance with the present invention, the monomers of formula (II) are chosen from the monomers of the first, second and third preferred embodiments as defined above, and in particular are chosen from the monomers of formula (II-1) as defined above, (II-2) as defined above, and the α-olefins as defined above.

According to the process in accordance with the invention, the proportion of monomers of formula (I) is preferably chosen such that the monomer of formula (I) or the monomers of formula (I) represent at most 50% by number relative to the total number of monomers of formulae (I) and (II). According to one particularly preferred embodiment, the monomer of formula (I) or the monomers of formula (I) represent from 5% to 30% approximately by number, and even more preferentially from 10% to 20% approximately by number, relative to the total number of monomers of formulae (I) and (II). Specifically, when the proportion of monomers of formula (I) is less than 5% by number, the degree of degradability of the polymer is not very significant, which is only of little appeal compared to non-degradable polymers. When the proportion of monomers of formula (I) is greater than 30% by number, the radical ring-opening polymerization process is impaired, in particular slowed down.

For the purposes of the present invention, a radical polymerization initiator is understood to mean a chemical species capable of forming free radicals, i.e. radicals having one or more unpaired electrons in their outer shell.

According to the process in accordance with the invention, the radical polymerization initiator is preferably chosen from organic peroxides and hydroperoxides, azo derivatives, and radical-generating redox couples (redox systems).

Among the organic peroxides and hydroperoxides, mention may particular be made of dilauroyl peroxide (LPO), t-butyl peroxyacetate, t-butyl peroxybenzoate, t-butyl peroxyoctoate, t-butyl peroxydodecanoate, t-butyl peroxyisobutyrate, t-amyl peroxypivalate, t-butyl peroxypivalate, diisopropyl peroxydicarbonate, dicyclohexyl peroxydicarbonate, dicumyl peroxide, dibenzoyl peroxide, potassium peroxydisulfate, sodium peroxydisulfate, ammonium peroxydisulfate, cumene hydroperoxide and t-butyl hydroperoxyde. Among these organic peroxides, LPO and t-butyl hydroperoxide are particularly preferred.

Among the azo derivatives, mention may in particular be made of 2,2'-azobis(isobutyronitrile) or AIBN, 2,2'-azobis (2-cyano-2-butane), dimethyl-2,2'-azobisdimethyl-isobutyrate, 4,4'-azobis(4-cyanopentanoic acid), 1,1'-azobis(cyclohexanecarbonitrile), 2-(t-butylazo)-2-cyanopropane, 2,2'-azobis[2-methyl-N(1,1)-bis(hydroxy-methyl)-2-hydroxyethyl]propanamide, 2,2'-azobis[2-methyl-N-hydroxyethyl]propanamide, 2,2'-azobis(N,N'-dimethyleneisobutyramidine) dihydrochloride, 2,2'-azobis (2-amidinopropane) dihydrochloride, 2,2'-azobis(N,N'-dimethyleneisobutyramine), 2,2'-azobis(2-methyl-N-[1,1-bis(hydroxymethyl)-2-hydroxyethyl]-propionamide), 2,2'-azobis(2-methyl-N-[1,1-bis(hydroxy-methyl) propionamide], 2,2'-azobis[2-methyl-N-(2-hydroxyethyl) propionamide], 2,2'-azobis(isobutyramide) dihydrate, 2,2'-azobis(2,2,4-trimethylpentane) and 2,2'-azobis(2-methylpropane). Among these azo derivatives, 2,2'-azobis (isobutyronitrile) is particularly preferred.

The redox systems of example chosen from the systems comprising combinations such as:

- mixtures of hydrogen peroxide, dialkyl peroxide, a hydroperoxide, a perester, a percarbonate and similar compounds and of an iron salt, a titanium salt, zinc formaldehyde sulfoxylate or sodium formaldehyde sulfoxylate, and of a reducing sugar,
- mixtures of an alkali metal or ammonium persulfate, perborate or perchlorate with an alkali metal bisulfite, such as sodium metabisulfite, and a reducing sugar, and
- mixtures of an alkali metal persulfate with an arylphosphinic acid, such as benzenephosphonic acid and other similar ones, and a reducing sugar.

Among such redox systems, the combinations of ammonium persulfate and sodium formaldehyde sulfoxylate, and of tert-butyl hydroperoxide and ascorbic acid, are very particularly preferred.

It is also possible to use a photochemical initiator, that can be used in ultraviolet (UV) or visible light. Among the initiators that can be used in UV light, mention may notably be made of 2,2-dimethoxy-2-phenylacetophenone, and benzophenone/amine or benzophenone/alcohol pairs. Among the initiators that can be used in visible light, mention may be made of thioxanthones. Lastly, it is also possible to use certain RAFT control agents of xanthate or trithiocarbonate type which are also good photochemical initiators in UV and visible light.

The amount of radical polymerization initiator to be used according to the process in accordance with the present invention is generally determined say that the amount of radicals generated is at most 5 mol % approximately relative to the total amount of monomers of formulae (I) and (II), and preferably at most 1 mol % approximately.

The step of radical ring-opening polymerization of the monomers of formulae (I) and (II) can be carried out in bulk (without solvent) or in solution in a solvent chosen so that the reaction medium remains homogeneous throughout the polymerization reaction. In general, the solvent is organic but it is not excluded to use an aqueous solvent such as water or a mixture of water and a co-solvent if the solubility of the monomer(s) warrants it. The polymerization of the monomers of formulae (I) and (II) may also be carried out in a heterogeneous medium, the polymer formed being insoluble in the reaction medium. The polymerization may also be carried out by precipitation, or in dispersion, in emulsion or in suspension.

According to one preferred embodiment of the invention, water, aqueous-alcoholic mixtures or organic solvents are used as reaction medium. Organic solvents are preferred.

The total amount of polymerizable material of the reaction medium (total amount of monomers of formulae (I) and of formula (II)) may be 100% when the polymerization is carried out in bulk, i.e. without solvent. When the polymerization is carried out in a solvent, this total amount may vary from 10% to 90% approximately by mass relative to the total mass of the reaction medium, preferably from 20% to 80% approximately by mass, and even more preferentially from 30% to 60% approximately relative to the total mass of the reaction medium.

The polymerization step of the process in accordance with the invention may be carried out at a temperature of from 5° C. to 150° C. approximately, depending on the nature of the monomers of formulae (I) and (II) used during the reaction. According to one preferred embodiment of the process of the invention, the polymerization step is carried out at a temperature of from 10° C. to 100° C. approximately, and even more preferentially from 20° C. to 80° C. approximately.

The duration of the polymerization step varies generally from 1 to 12 hours approximately, and even more preferentially from 2 to 8 hours approximately.

As indicated previously, the polymerization step is preferably carried out solely in the presence of the monomers of formulae (I) and (II) and of a radical polymerization initiator, i.e. without a polymerization control agent. However, according to one variant of the process in accordance with the invention, it is nevertheless possible to implement the polymerization step in the presence of a polymerization control agent, thus making it possible to obtain block, composition-gradient, comb, star-grafted or else hyperbranched copolymers, which are preferably degradable. Specifically, various controlled radical polymerization processes are known, that make it possible to obtain polymers having controlled architecture and masse. These processes are defined according to the chemical nature of the control agents involved. The present invention may involve a control agent for the technologies of radical polymerization controlled by reversible addition-fragmentation chain transfer (RAFT), notably in the presence of xanthates (Macromolecular Design by Interchange of Xanthates (MADIX)), of atom transfer radical polymerization (ATRP), of iodine transfer polymerization (ITP), of reversible chain transfer-catalyzed radical polymerization (RCTP), of tellurium-mediated radical polymerization (TERP), of polymerization in the presence of organocobalt compounds (cobalt-mediated radical polymerization (CoMP)), or else of reversible coordination-mediated polymerization RCMP). These various technologies are described in the reference Polymer Chemistry 2018, 9, 4947-4967 and cited references.

The process of the invention may additionally use, during the polymerization step, unsaturated monomers other than the monomers of formula (II), such as for example monomers chosen from acrylates, methacrylates, acrylamides, methacrylamides, styrene compounds, diallyl compounds, vinyl phosphonates, and vinyl sulfonates.

The process of the invention thus makes it possible to result in a copolymer having thioesters bonds (when X=—$CH_2$—) or thiocarbonate bonds (when X=—O—) which are easily degradable.

In said process using a cyclic monomer (I) with at least one monomer comprising an ethylenic unsaturation (II) in the presence of a radical polymerization initiator via radical pathway, a fraction of the cyclic monomer (I) may also be consumed during the polymerization without the ring opening taking place. The copolymer thus obtained then comprises, besides thioester or thiocarbonates bonds by ring opening, cyclic units of monomer (I) having thioacetal and/or orthodithioester bonds.

The cyclic units of monomer (I) having thioacetal and/or orthodithioester bonds have the advantage of being sensitive to chemical attack, and therefore potentially degradable.

The degradable copolymers obtained by the implementation of the process in accordance with the present invention are novel per se and constitute in this respect to the second subject of the invention.

The second subject of the present invention is therefore a copolymer, preferably degradable copolymer, said polymer being characterized in that it comprises thioester or thiocarbonate bonds, and that it results from the radical ring-opening polymerization of:

(i) at least one cyclic monomer chosen from thionolactones and thionocarbonates of formula (I) below:

(I)

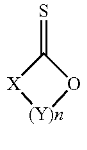

wherein:

X is an oxygen atom or a —$CH_2$— group;

Y is chosen from —$CH_2$—, —$CH_2$—O—$CH_2$—, —O—$CH_2$—$CH_2$, —$CH_2$—$CH_2$—O—$CH_2$—$CH_2$ and $CH_2$—O—$CH_2$—$CH_2$ groups;

n is an integer greater than or equal to 1;

it being understood that:

when Y represents a —$CH_2$— group, then n is greater than or equal to 4, when X represents an oxygen atom, then Y is other than an —O—$CH_2$—$CH_2$— group; and when X represents a —$CH_2$— group, and when Y represents an —O—$CH_2$—$CH_2$— group, then the oxygen atom of the Y group is connected to X; and (ii) at least one monomer comprising an ethylenic unsaturation chosen from the monomers of formula (II) below:

(II)

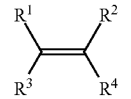

wherein:

$R^1$, $R^2$ and $R^3$ are identical and represent a hydrogen atom, $R^4$ represents a hydrogen atom, an alkyl radical, or a group chosen from imidazole, alkylimidazolium, carbazole, —OC(O)$R^5$ groups, or a group of formula (III) below:

(III)

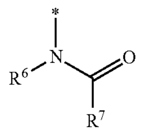

$R^5$ represents an alkyl, haloalkyl, trifluoroalkyl, aryl or arylalkyl radical, the asterisk (*) represents the anchoring point of the group of formula (III) to the carbon atom of the compound of formula (II), $R^6$ and $R^7$, which are identical or different, represent a hydrogen atom, an alkyl, cycloalkyl, arylalkyl, aryl, glycidyl radical, or else $R^6$ and $R^7$, together with the nitrogen and carbon atoms of the group of formula (III) to which they are bonded, form a heterocycle comprising from 4 to 7 carbon atoms (by including the carbon atom bearing the oxygen atom), in the presence of a radical polymerization initiator.

The preferences indicated above with reference to the first object of the invention relating to the monomers of formulae (I) and (II), also applied to the second subject of the invention.

According to one particular and preferred embodiment of the invention, said statistical copolymer results from the polymerization of ε-thionocaprolactone and vinyl acetate or from the copolymerization of ε-thionocaprolactone and vinyl acetate in the presence of a xanthate, such as O-ethyl S-(1-methoxycarbonylethyl)-dithiocarbonate, as radical polymerization control agent.

According to one preferred embodiment of the second subject of the invention, the copolymer, which is preferably degradable, is a statistical copolymer.

According to the invention, the copolymer, which is preferably degradable, preferably has a number-average molar mass of from 2000 to 200 000 g/mol approximately, and even more preferentially from 5000 to 100 000 g/mol approximately.

The polymolecularity index of the polymer, which is preferably degradable, in accordance with the invention preferably varies from 1.2 to 4, and even more preferentially from 1.4 to 3.

The content of thioester bonds (when X=—$CH_2$—) or thiocarbonate bonds (when X=—O—) in the main chain of the degradable copolymer in accordance with the invention is preferably at least 2% by number, preferentially from 2% to 15% by number, and even more preferentially from 5% to 10% by number, relative to the total number of bonds of the main chain.

According to the invention, the main chain of the copolymer is understood to mean the longest sequence of bonds, i.e. not including the bonds of the side substituents.

Owing to their degradable nature, the copolymers in accordance with the present invention can be of use in any type of industry. By way of example, mention may particular be made of the biomedical field, agriculture, cosmetics, petroleum extraction, detergency, release of active ingredients and packaging.

For the copolymers of the invention which might only have a low, or even zero, degradability, these could also be of use in the medical field, notably for dental amalgam, or any type of food for which it is desired to reduce the shrinkage associated with polymerization.

EXAMPLES

Example 1: Synthesis of a Degradable Copolymer Based on Vinyl Acetate and ε-Thionocaprolactone According to the Process of the Invention

1) First Step: Synthesis of ε-thionocaprolactone (Product of Formula (I-1))

Introduced into a 500-ml two-necked round-bottomed flask topped with a condenser were $P_4S_{10}$ (21.9 mmol, 0.25 eq), ε-caprolactone (87.91 mmol, 1 eq), hexamethyldisiloxane (HMDSO) (146.31 mmol, 1.67 eq) and 90 ml of anhydrous acetonitrile. After inerting for 10 minutes with a flow of argon, the mixture was heated at 82° C. for 2 hours. Next, the reaction medium was cooled to 0° C. 22.5 ml of a 5M solution of $K_2CO_3$ were added slowly to the medium, this medium being maintained at 0° C. for 30 min after the end of the introduction. Next, the mixture was diluted with 200 ml of diethyl ether, then the product was extracted with 2×100 ml of water, and then with 100 ml of brine. The organic phase was then dried over magnesium sulfate and then the solvent was evaporated under vacuum. The product was purified by column chromatography (7/3 cyclohexane/ethyl acetate eluent). The yield was 60%. The final product was a yellow liquid.

NMR: $^1H$ ($CDCl_3$; 300 MHz): 1.79 ppm (m, 2H); 1.91 ppm (m, 4H); 3.20 ppm (m, 2H); 4.50 ppm (t, 2H).

$^{13}C$ ($CDCl_3$; 300 MHz): 25.9 ppm; 28.51 ppm; 28.63 ppm; 46.17 ppm; 74.37 ppm; 227.47 ppm.

2) Second Step: Synthesis of the Copolymer

Introduced into a Schlenk tube were 0.017 g (0.103 mmol) of azobisisobutyronitrile (AIBN), 0.235 g (1.8 mmol) of the ε-thionocaprolactone obtained above in the preceding step and 1.622 g (18.85 mmol) of vinyl acetate. The ε-thionocaprolactone (monomer of formula (I-1)) represented 9.54% (mol %) relative to the vinyl acetate (monomer of formula (II)). The reaction medium was degassed then maintained under argon at a temperature of 70° C. for 5 hours and 20 minutes. The monomer conversion, determined by hydrogen nuclear magnetic resonance ($^1H$ NMR), was 100% for the ε-thionocaprolactone and 85% for the vinyl acetate. The reaction medium was taken up in a minimum amount of toluene then precipitated in petroleum ether. The number-average molar mass (Mn), and also the polymolecularity index (Mw/Mn) of the purified polymer thus obtained, in powder form, were measured by size exclusion chromatography (eluant: dimethylformamide (DMF)/10 mM LiBr) with a calibration curve based on polystyrene. Mn=32 800 g/mol; Mw/Mn=2.83.

Example 2: Synthesis of a Degradable Statistical Copolymer Based on Vinyl Acetate and ε-thionocaprolactone in the Presence of a Xanthate According to the Process of the Invention Introduced into a Schlenk tube were 0.064 g of AIBN (0.388 mmol), 1.04 g (7.99 mmol) of ε-thionocaprolactone, as prepared above in step 1) of example 1, and 5.75 g (66.8 mmol) of vinyl acetate in the presence of 0.159 g of O-ethyl S-(1-methoxycarbonylethyl)dithiocarbonate (0.716 mmol), as polymerization control agent. The O-ethyl S-(1-methoxycarbonylethyl)dithiocarbonate was synthesized beforehand by according to the protocol indicated by Liu et al. (ACS Macro Mett, 2015, 4, 89-93). The reaction medium was degassed then maintained under argon at 70° C. for 7 h. The monomer conversion, determined by 1H NMR, was 95% for ε-thionocaprolactone and 69% for vinyl acetate. The reaction medium was taken up in a minimum amount of toluene and precipitated in petroleum ether. Next, the number-average molar mass and the polymolecularity index of the purified polymer, obtained in powder form, were measured as indicated above in example 1. Mn=6000 g/mol; Mw/Mn=1.54.

Example 3: Synthesis of a Degradable Copolymer Based on Vinyl Pivalate and ε-Thionocaprolactone in the Presence of a Xanthate According to the Process of the Invention Introduced into a 500-ml two-necked round-bottomed flask were 3.285 g of AIBN (0.02 mol), 13 g (0.1 mol) of ε-thionocaprolactone, as prepared above in step 1) of example 1, and 115.35 g (0.9 mol) of vinyl pivalate in the presence of 5.4 g (0.026 mol) of O-ethyl S-(1-methoxycarbonylethyl)dithiocarbonate, polymerization control agent. The reaction medium was degassed then maintained under argon at 70° C. for 18 h. The monomer conversion, determined by 1H NMR, was 85% for ε-thionocaprolactone and 92% for vinyl acetate. The reaction medium was taken up in a minimum amount of toluene and precipitated in petroleum ether. Next, the number-average molar mass and the polymolecularity index of the purified polymer, obtained in powder form, were measured as indicated above in example 1. Mn=4500 g/mol; Mw/Mn=1.7.

Example 4: Chemical Degradation of the Copolymer Based on Vinyl Pivalate and ε-thionocaprolactone from Example 3

20 mg of the copolymer from example 3 were diluted in 10 ml of dichloromethane before addition of 10 ml of isopropylamine. The reaction medium was stirred overnight at ambient temperature. The solvent and the amine were then evaporated under reduced pressure, and then the residue was dissolved in THF and analyzed by size exclusion chromatography with apparatus equipped with two Styragel H3R and HR4E columns, a refractometer detector and a light scattering detector, for analysis in tetrahydrofuran (THF) at 35° C. and a flow rate of 1 mn/min. It appears that after degradation of the copolymer by isopropylamine, the molar mass distribution is greatly shifted to the range of low molar masses compared to the polymer before treatment, attesting to the degradation of the backbone resulting from the presence of the thioester bonds. It should be noted that it was verified that, under identical chemical treatment conditions, a sample of poly(vinyl pivalate) of the same molar mass did not undergo any detectable chemical modification.

Example 5: Synthesis of a Degradable Copolymer Based on Vinyl Acetate and ω-Pentadecathionolactone According to the Process of the Invention

1) First Step: Synthesis of ω-pentadecathionolactone (Product of Formula (I-2))

Introduced into a 500-ml two-necked round-bottomed flask topped with a condenser were $P_4S_{10}$ (21.9 mmol, 0.25 eq), ω-pentadecalactone (87.91 mmol, 1 eq), hexamethyldisiloxane (HMDSO) (146.31 mmol, 1.67 eq) and 90 ml of of anhydrous p-xylene. After inerting for 10 minutes with a flow of argon, the mixture was heated at 140° C. for 4 hours. Next, the reaction medium was cooled to 0° C. 22.5 ml of a 5M solution of $K_2CO_3$ were added slowly to the medium, this medium being maintained at 0° C. for 30 min after the end of the introduction. Next, the mixture was diluted with 200 ml of diethyl ether, then the product was extracted with 2×100 ml of water, and then with 100 ml of brine. The organic phase was then dried over magnesium sulfate and then the solvent was evaporated under vacuum. The product was purified by column chromatography (9/1 cyclohexane/ethyl acetate eluent). The yield was 70%. The final product was a yellow liquid.

NMR: $^1H$ ($CDCl_3$; 300 MHz): 1.33 ppm-1.25 (m, 24H); 2.81 ppm (t, 2H); 4.47 ppm (t, 2H).

2) Second Step: Synthesis of the Copolymer

Introduced into a Schlenk tube were 0.038 g (0.16 mmol) of azobisiso(cyanocyclohexane) (VAZO-88), 0.4 g (1.5 mmol) of ω-pentadecathionolactone obtained in the preceding step and 0.8 g (15 mmol) of vinyl pivalate. The ω-pentadecathionolactone (monomer of formula (I-2)) represents 20% (mol %) relative to the vinyl acetate (monomer of formula (II)). The reaction medium was degassed then maintained under argon at a temperature of 88° C. for 5 hours and 20 minutes. The monomer conversion, determined by hydrogen nuclear magnetic resonance (1H NMR), was 25% for the ω-pentadecathionolactone and 92% for the vinyl pivalate. The reaction medium was taken up in a minimum amount of toluene then precipitated in petroleum ether. The number-average molar mass (Mn), and also the polymolecularity index (Mw/Mn) of the purified polymer thus obtained, in powder form, were measured by size exclusion chromatography (eluant: dimethylformamide (DMF)/10 mM LiBr) with a calibration curve based on polystyrene. Mn=2200 g/mol; Mw/Mn=3.8.

Example 6: Chemical Degradation of the Copolymer Based on Vinyl Acetate and on ε-Thionocaprolactone from Example 1

20 mg of the copolymer from example 1 were diluted in 2 ml of dichloromethane before addition of 2 ml of isopropylamine. The reaction medium was stirred overnight at ambient temperature. The solvent and the amine were then evaporated under reduced pressure, and then the residue was dissolved in THF and analyzed by size exclusion chromatography with apparatus equipped with two Styragel H3R and HR4E columns, a refractometer detector and a light scattering detector, for analysis in tetrahydrofuran (THF) at 35° C. and a flow rate of 1 mn/min, Mn=1.5 kDa, Đ=3.83. It appears that after degradation of the copolymer by isopropylamine, the molar mass distribution is greatly shifted to the range of low molar masses compared to the polymer before treatment, attesting to the degradation of the backbone resulting from the presence of the thioester bonds.

The invention claimed is:

1. A process for preparing copolymers, said process comprising at least one step of radical ring-opening polymerization of at least one cyclic monomer with at least one monomer comprising an ethylenic unsaturation, in the presence of a radical polymerization initiator, wherein:

(i) the cyclic monomer is chosen from thionolactones and thionocarbonates of formula (I) below:

(I)

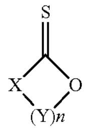

wherein:

X is an oxygen atom or a —$CH_2$— group;

Y is chosen from —$CH_2$—, —$CH_2$—O—$CH_2$—, —O—$CH_2$—$CH_2$, —$CH_2$—$CH_2$—O—$CH_2$—$CH_2$ and $CH_2$—O—$CH_2$—$CH_2$ groups;

n is an integer greater than or equal to 1;

wherein:

when Y represents a —$CH_2$— group, then n is greater than or equal to 4, when X represents an oxygen atom, then Y is other than an —O—$CH_2$—$CH_2$— group; and when X represents a —$CH_2$— group, and when Y represents an —O—$CH_2$—$CH_2$— group, then the oxygen atom of the Y group is connected to X; and (ii) the monomer comprising an ethylenic unsaturation is chosen from the monomers of formula (II) below:

(II)

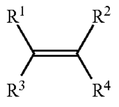

wherein:

$R^1$, $R^2$ and $R^3$ are identical and represent a hydrogen atom, $R^4$ represents a hydrogen atom, an alkyl radical, or a group chosen from imidazole, alkylimidazolium, carbazole, —OC(O)$R^5$ groups, or a group of formula (III) below:

(III)

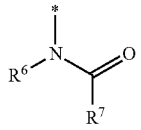

$R^5$ represents an alkyl, haloalkyl, trifluoroalkyl, aryl or arylalkyl radical, the asterisk (*) represents the anchoring point of the group of formula (III) to the carbon atom of the compound of formula (II), $R^6$ and $R^7$, which are identical or different, represent a hydrogen atom, an alkyl, cycloalkyl, arylalkyl, aryl, glycidyl radical, or else $R^6$ and $R^7$, together with the nitrogen and carbon atoms of the group of formula (III) to which they are bonded, form a heterocycle comprising from 4 to 7 carbon atoms.

2. The process as claimed in claim 1, wherein the thionolactones or thionocarbonates of formula (I)) are chosen from ε-thionocaprolactone, ω-pentadecathionolactone, nonadecathionolactone, tricosathionolactone, crown ethers comprising a thionoester, tetramethylene thionocarbonate and diethylene glycol thionocarbonate.

3. The process as claimed in claim 1, wherein the monomers of formula (II) are chosen from vinyl esters of formula (II-1) below:

(II-1)

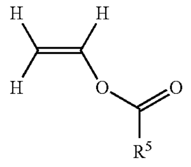

wherein $R^5$ represents an alkyl, haloalkyl, trifluoroalkyl, aryl or arylalkyl radical.

4. The process as claimed in claim 3, wherein the monomers of formula (II-1) are chosen from vinyl acetate, vinyl pivalate, vinyl trifluoroacetate, vinyl chloroacetate, vinyl propionate, vinyl butyrate, vinyl neodecanoate and vinyl trifluorobutyrate.

5. The process as claimed claim 1, wherein the monomers of formula (II) are chosen from those wherein $R^4$ represents a linear or branched alkyl radical.

6. The process as claimed in claim 5, wherein the monomers of formula (II) are chosen from ethylene and octene.

7. The process as claimed in claim 1, wherein the monomers of formula (II) are chosen from N-vinyl monomers of formula (II-2) below:

(II-2)

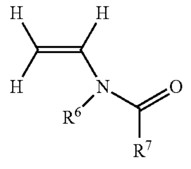

wherein $R^6$ and $R^7$, which are identical or different, represent a hydrogen atom, an alkyl, cycloalkyl, arylalkyl, aryl, glycidyl radical, or else $R^6$ and $R^7$, together with the nitrogen and carbon atoms of the group of formula (III) to which they are bonded, form a heterocycle comprising from 4 to 7 carbon atoms.

8. The process as claimed in claim 7, wherein the monomers of formula (II-2) are chosen from N-vinylformamide, N-vinylacetamide, N-methyl-N-vinylacetamide, N-vinylpyrrolidone, N-vinylpiperidone, and N-vinylcaprolactame.

9. The process as claimed in claim 1, wherein the monomer(s) of formula (I) represent at most 50% by number relative to the total number of monomers of formulae (I) and (II).

10. The process as claimed in claim 1, wherein the monomer(s) of formula (I) represent from 5% to 30% approximately by number, relative to the total number of monomers of formulae (I) and (II).

11. The process as claimed in claim 1, wherein the radical ring-opening polymerization of the monomers of formulae (I) and (II) is carried out in bulk or in solution in a solvent.

12. The process as claimed in claim 1, wherein the polymerization is carried out in a solvent and in that the total amount of monomers of formulae (I) and of formula (II) varies from 30% to 60% by mass relative to the total mass of the reaction medium.

13. The process as claimed in claim 1, wherein the polymerization is carried out at a temperature of from 5° C. to 150° C.

14. The process as claimed in claim 1, wherein the polymerization is carried out in the presence of a polymerization control agent.

* * * * *